United States Patent [19]

Irvin

[11] 4,019,249

[45] Apr. 26, 1977

[54] METHOD AND FIXTURE FOR THE ASSEMBLY OF DYNAMOELECTRIC MACHINES

[75] Inventor: Charles F. Irvin, Sugar Creek Township, Ohio

[73] Assignee: Westinghouse Electric Corporation, Pittsburgh, Pa.

[22] Filed: Dec. 10, 1975

[21] Appl. No.: 639,338

[52] U.S. Cl. .................................. 29/596; 29/732; 310/42
[51] Int. Cl.² ...................................... H02K 15/00
[58] Field of Search ............... 29/596, 598, 205 R; 310/42

[56] References Cited
UNITED STATES PATENTS 3,209,434  10/1965  Anderson, Jr. ..................... 29/596
3,333,330  8/1967  Linkous .............................. 29/596
3,716,912  3/1973  Vind .................................. 29/596
3,798,757  3/1974  Hennessey et al. ................. 29/596

*Primary Examiner*—Willie G. Abercrombie
*Attorney, Agent, or Firm*—G. H. Telfer

[57] ABSTRACT

A stator core is held at reference surfaces having a predetermined distance from a center line along which a rotor is supported at its shaft extensions without introduction of shims or other supports directly between the rotor and stator, in which position the end bells containing the bearings through which the rotor shaft extensions run can be secured to the stator core to provide a consistently reproducible air gap between the rotor and stator.

6 Claims, 3 Drawing Figures

METHOD AND FIXTURE FOR THE ASSEMBLY OF DYNAMOELECTRIC MACHINES

BACKGROUND OF THE INVENTION

This invention relates to methods and apparatus for the assembly of dynamoelectric machines such as small (or fractional horsepower) motors.

In the past it has been the general practice in assembling a rotor within a stator of a small motor to place the rotor assembly in the stator bore and to space the rotor from the surface of the stator bore using shims or the like between the two elements. A permanent assembly is formed with end bells that secure the rotor within bearings and are secured themselves to the stator core after which the shims must be removed from the air gap. The practice of this technique, although generally successful, involves considerable labor and expense and is subject to manual skill to provide consistently successfully assembled motors with an air gap that permits operation without danger of contact between the rotor surface and the inside of the stator.

Other motor assembly techniques have been used and proposed particularly in relation to large dynamoelectric machines. Examples of such techniques are contained in U.S. Pat. Nos. 3,375,382 and 3,716,912. There remains interest in providing a simple procedure and mechanism for the assembly of small motors without the use of shims or other intermediate support elements between the rotor and stator.

SUMMARY OF THE INVENTION

In accordance with the present invention, a stator core is held at reference surfaces having a predetermined distance from a center line along which a rotor is supported at its shaft extensions without introduction of shims or other supports directly between the rotor and stator. End bells containing the bearings through which the rotor shaft extensions run can then be secured to the stator core to provide a consistently reproducible air gap between the rotor and stator.

The invention resides in part in the provision of a fixture that permits a method of assembly by which the stator core can be placed with a known location of the bore center line, that is, by having reference surfaces on the stator at which the stator can be supported that are of a predetermined distance from the center line. Also, the fixture and method permit location of a shaft mounted rotor with a shaft axis located along the same center line so that when held in the fixture the rotor and stator are properly located in relation to each other and the end bells supporting the rotor bearings can be affixed to the stator while in the fixture and while there is assurance that the air gap will not change.

DESCRIPTION OF THE PREFERRED EMBODIMENTS

Figure 1:
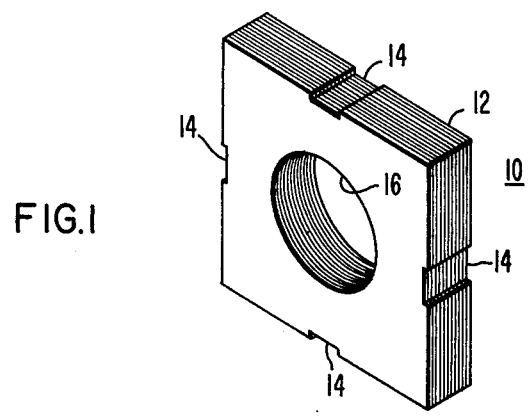
FIG. 1 is a perspective view of a stator core that is suitable for use in the practice of the present invention and FIGS. 2 and 3 are respectively side and front elevation views of a fixture for performing the method of the present invention.

Referring to FIG. 1, there is shown a stator core 10 for a small motor. The core comprises a plurality of laminations 12 of conventional magnetic steel placed in a stack. The laminations 12 have controlled bedding surfaces 14 or reference surfaces on four sides so that there is a controlled dimension X between the interior surface of the stator bore 16 and the controlled reference surfaces 14. It is convenient for the controlled surfaces 14 to be at the center of the edge surfaces of a four-sided stator core.

Figure 2:
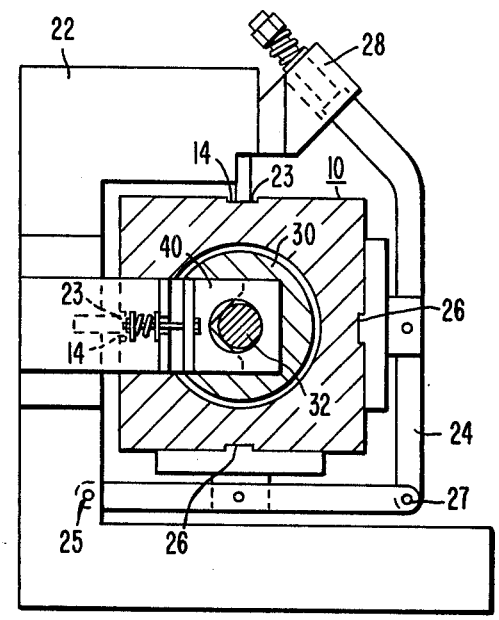
Figure 3:
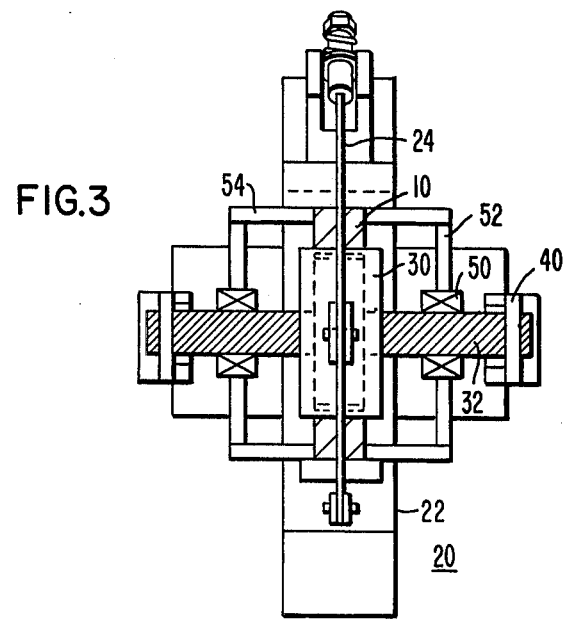

In FIGS. 2 and 3, the core 10 is shown in a fixture 20 with a fixed member 22 having points 23 in contact with two of the four core reference surfaces 14. The fixture 20 also comprises a movable member 24 which in the embodiment shown is a member pivotally secured at point 25 to the fixed member and has two additional points 26 thereon that bear against the diametrically opposing reference surfaces 14 opposite to the surfaces at which the points 23 of the fixed member bear. The movable member 24 is hinged at point 27 so as to extend around the surfaces of the core 10 and it can be placed in a closed position by locking it against the fixed member at point 28.

While the stator core 10 is in the described position a rotor 30 is placed in the bore thereof. The rotor 30 is on a shaft 32 and is supported at the shaft extensions within support means 40 that are secured to the fixed member 22 of the fixture. The support means 40 has a single fixed position for location of the rotor shaft 32 on a center line that is in fixed predetermined relation to the controlled stator surfaces 14. Thus, automatic air gap spacing is provided. That is, the fixture 20 is such that an operator need not adjust the relation of the means 40 for supporting the rotor in relation to the fixed member upon each occasion of use, but rather these elements are predetermined for a rotor and stator of certain size and merely by mounting or assembly of these elements in their natural location is the desired relation between the rotor and stator achieved, all without the use of shims or any other elements in the air gap. Axial adjustment of the rotor within the stator core may be achieved either by the fixture itself, if it has predetermined end stops for the shaft extensions, or by visual alignment; such alignment not being nearly as critical as the air gap spacing.

The structure elements shown in the Figures are in simplified form for ease of illustration and clarity of understanding. It will be understood of course that the stator core 10 is intended to be a wound stator, that is, containing coils of wire within core slots that extend from the cylindrical bore surface. The rotor is suitably a conventional skewed squirrel cage type of rotor for small induction motors.

The rotor has bearings 50 on its shaft extensions which are supported within end bells 52 (both of which are schematically shown in FIG. 3), which are placed in the fixture with the shaft mounted rotor as a single unit. After the rotor is placed within the means for supporting it on the prescribed center line, the end bells 52 are then permanently secured to the stator 10 as by welding or otherwise joining them together using elongated beams or rods 54 at the corners of the stator or other structural elements.

I claim:

1. A method of assembly of a dynamoelectric machine with proper alignment of rotating parts in relation to stationary parts, comprising the steps of:
   stacking a plurality of stator core laminations to form a core stack having a predetermined distance between a central bore and control surfaces of said stack removed from said bore;

placing said core stack in a fixture wherein said core stack is held at said control surfaces;

placing a shaft mounted rotor within said bore of said core stack and holding said rotor in fixed position by said fixture wherein said rotor is held along a shaft center line at points which are fixed relation to said control surfaces of said stack, said rotor being held in spaced relation from said stator with an air gap therebetween free of supporting elements;

placing an end bell containing a bearing over a first shaft extension of said rotor; and, securing said end bell and said core stack together.

2. A method of dynamoelectric machine assembly in accordance with claim 1 further comprising:

placing a second end bell containing a bearing over a second shaft extension of said rotor; and, securing said second end bell and said core stack together.

3. A method of dynamoelectric machine assembly in accordance with claim 1 wherein: prior to the step of securing said end bell and said core stack together, the step is performed of adjusting said rotor axially within said core stack.

4. A method of dynamoelectric machine assembly in accordance with claim 1 wherein: said step of securing said end bell and said core stack together is performed by welding.

5. A fixture for the assembly of dynamoelectric machines comprising:

a fixed member having a pair of fixed points for bearing against surface of a stator core, said points being located in relation to a center line on radii that are spaced 90°;

a movable member pivotally secured to said fixed member and movable between a first, open, position permitting a stator core to be placed in said fixture and a second, closed, position in which a core is in fixed position with a pair of points on said movable member bearing against surfaces of a core that are diametrically opposed to said surfaces against which said fixed points of said fixed member bear; and, means for supporting a shaft mounted rotor assembly at points along the shaft external of the rotor with said shaft central axis aligned along said center line, said rotor assembly including bearings and end bells to be secured to said stator.

6. A fixture for the assembly of dynamoelectric machines in accordance with claim 5 wherein:

said movable member and said means for supporting a rotor assembly are adjustably secured to said fixed member to secure said stator core and rotor with respect to each other in spaced relation without introduction of support elements therebetween.

* * * * *